May 4, 1937.   C. P. CIRAC ET AL   2,079,106
REVERSE LOCK MECHANISM
Filed Sept. 16, 1936   2 Sheets-Sheet 1
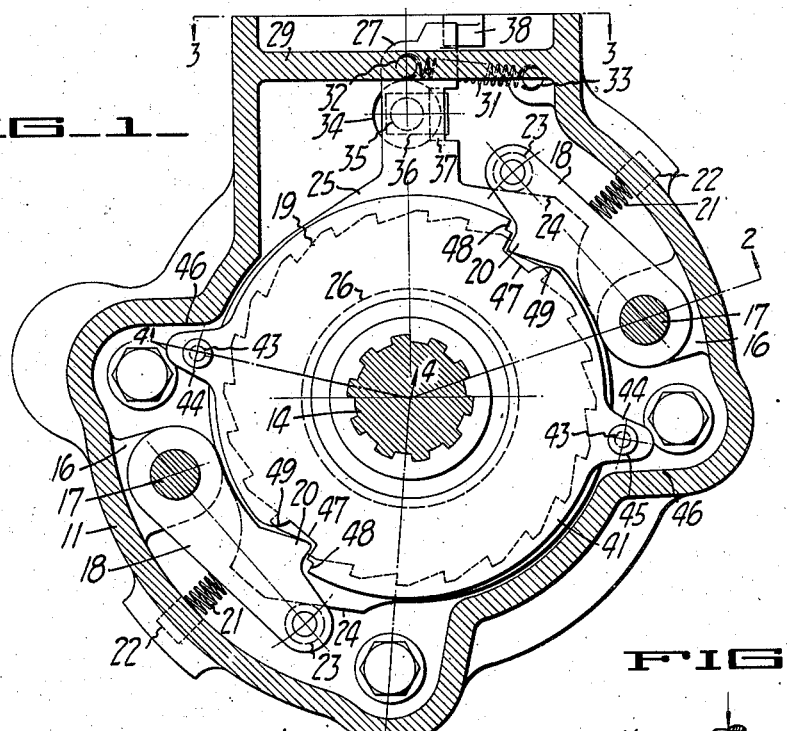
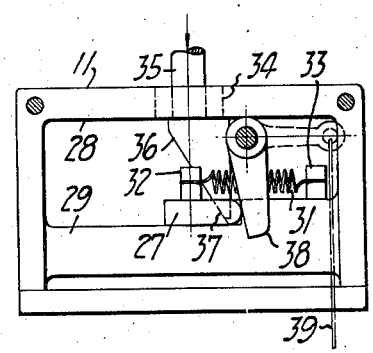
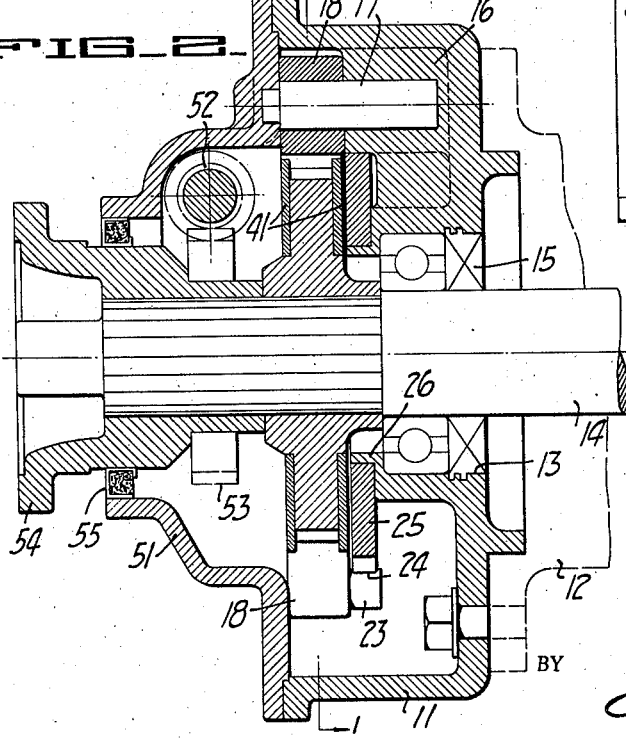
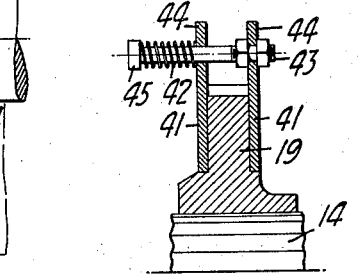
INVENTORS
CHARLES P. CIRAC
THOMAS W. COOPER
WILLIAM W. MACDONALD
BY
ATTORNEY.

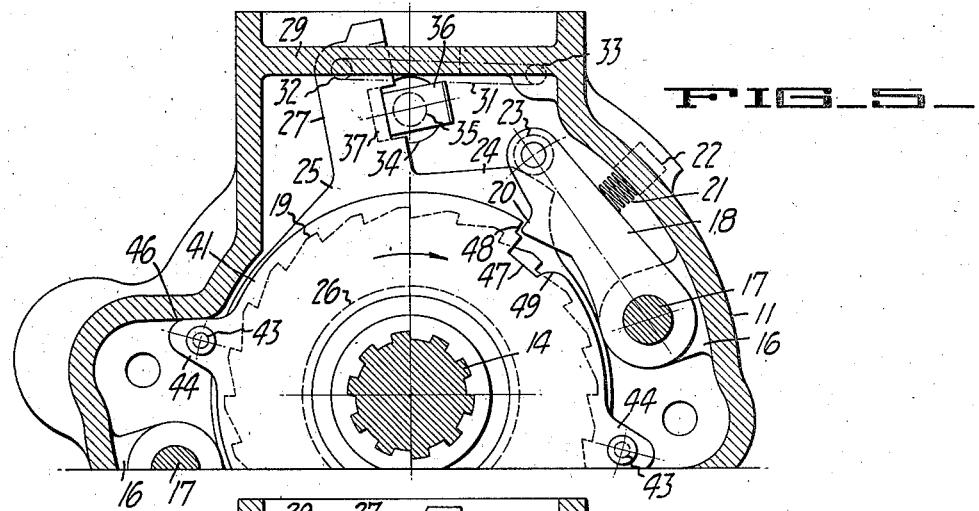
FIG_5_
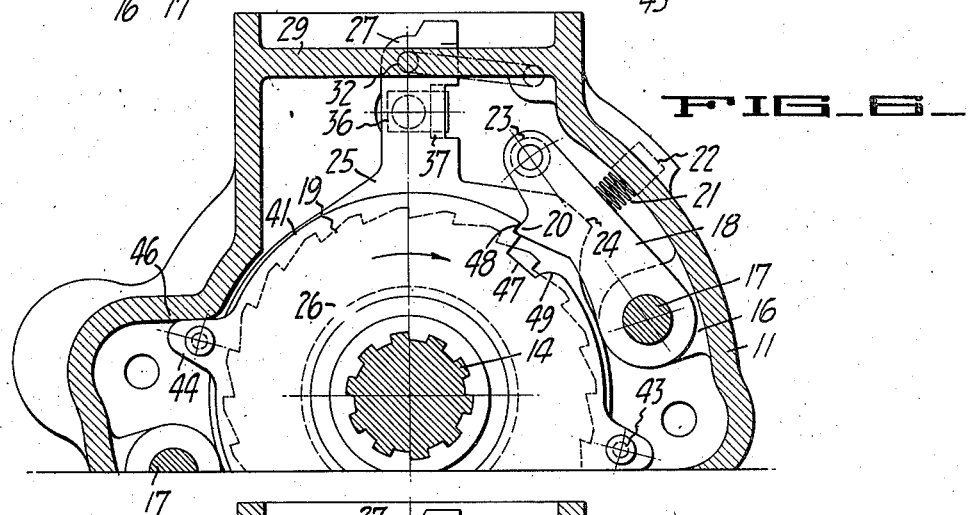
FIG_6_
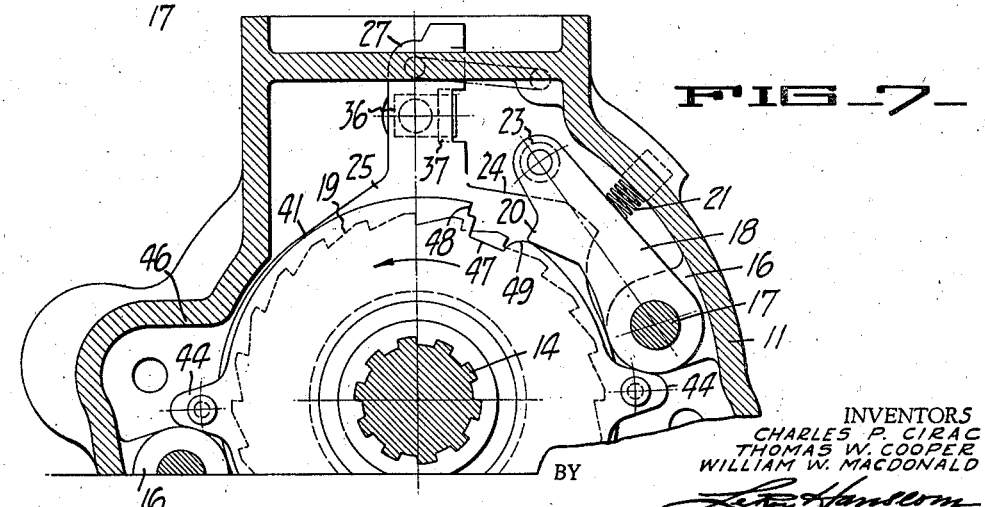
FIG_7_
INVENTORS
CHARLES P. CIRAC
THOMAS W. COOPER
WILLIAM W. MACDONALD
BY
ATTORNEY.

Patented May 4, 1937

2,079,106

UNITED STATES PATENT OFFICE 2,079,106

REVERSE LOCK MECHANISM

Charles P. Cirac and Thomas W. Cooper, San Francisco, and William W. MacDonald, Mountain View, Calif., assignors, by direct and mesne assignments, to Cirac Automatic Reverse Control Company, San Francisco, Calif.

Application September 16, 1936, Serial No. 101,064

8 Claims. (Cl. 192—4)

This invention relates in general to motor vehicles and in particular to automatic means for locking a vehicle against rearward motion except when the vehicle is in reverse gear or has been shifted from reverse to neutral or to some forward gear without actual movement of the vehicle in a forward direction.

Although devices of this general nature are disclosed in the Cirac Patents Nos. 1,237,169, 1,362,783, 1,388,404, 1,450,409, 1,525,719, 1,748,410, 1,780,907, and 1,875,417, it has been found that the devices disclosed therein are not foolproof from the standpoint of operation and are too complicated from a manufacturing standpoint.

In general, the object of this invention is the provision of means for automatically locking one or more of the drive wheels of a vehicle against reverse rotation unless the vehicle has first been placed in reverse gear or has been shifted from reverse to neutral or to a forward gear, and for automatically disengaging such locking means upon a very slight movement of the driving mechanism in a direction which has a tendency to propel the vehicle forward.

More specifically, the object of the invention is the provision of a ratchet wheel to be secured either directly to the drive wheel of a vehicle or indirectly thereto, as for example, by attachment to the drive shaft, a ratchet adapted to be pivoted to any fixed portion of the vehicle, and in one position to engage the ratchet wheel, and means for holding the ratchet out of engagement with the ratchet wheel when the vehicle is in reverse gear or has been shifted from reverse to neutral or to any forward gear.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is a vertical section taken through a locking mechanism embodying the objects of our invention.

Figure 2 is a section taken on the line 2—2 of Figure 1.

Figure 3 is a horizontal section taken on the line 3—3 of Figure 1.

Figure 4 is a detail section taken on the line 4—4 of Figure 1.

Figure 5 is a partial vertical section of the locking mechanism showing the relative position of its various parts when the vehicle to which it is attached has been placed in reverse gear.

Figure 6 is a view similar to that shown in Figure 5 but showing the relative position of the various parts of the mechanism when a shift has been made from reverse gear to neutral or to any forward gear.

Figure 7 is a vertical section of the mechanism showing the relative position of its parts when the vehicle to which it is attached is moving forward in a forward gear.

Although the reverse locking mechanism embodying the objects of our invention may be secured either to the drive shaft of a vehicle or to any member driven thereby, such as one of the drive wheels of a trailer or other vehicle, for the purposes of illustration we have elected to attach our reverse locking mechanism directly to the drive shaft of a motor vehicle as shown in the various figures of the drawings.

As thus embodied, our invention contemplates the use of a base member or casing 11 adapted to be bolted to the transmission casing 12 of a motor vehicle as shown in dotted line in Figure 2. The casing 11 is formed with a central opening 13 through which the drive shaft 14 may pass. In order to seal the shaft 14 to the casing 11, resort may be had to a conventional stuffing box 15. Cast integral within the casing 11 is a pair of diametrically opposed inwardly extending lugs 16, within which are pivoted pins 17.

Secured to the outer ends of the pins 17 are ratchets 18 having pawls 20 adapted to engage the teeth of a ratchet wheel 19 keyed to the shaft 14. Springs 21 seated in sockets 22 formed in the casing 11 serve to urge the free ends of the ratchets 18 in engagement with the teeth of the ratchet wheel 19. Secured to the outer ends of the ratchets 18 are rollers 23 adapted to be engaged by the cam surfaces 24 of a manual control plate 25 journaled on the inwardly extending sleeve 26 of the casing 11. Formed integral with the plate 25 is an arm 27 extending upwardly through a slot 28 formed in the upper wall 29 of the casing 11.

The arm 27 is urged in a clockwise direction by means of a spring 31 secured at one end to a pin 32 extending outwardly from the arm 27 and at its other end to a pin 33 secured to the casing 11 and extending into the slot 28. Extending through an opening 34 formed in the upper portion of the casing 11 is a rod 35, the free end of which is provided with a beveled cam surface 36 adapted to engage a complementary surface 37 formed on the arm 27. From this construction it will be seen that an inward movement of the rod 35 will result in a counterclockwise movement of the manual control plate, the extent of this movement being of course governed by the nature of the cam surfaces 36 and 37 and the longitudinal movement of the rod 35. Although not shown, the rod 35 is connected either directly or indirectly to the gear shift lever of the vehicle in such a manner that the manual control plate 25 will move in a counterclockwise direction when the vehicle is put into reverse gear.

The counter clockwise movement of the plate 25 may also be produced by means of an L-shaped lever 38 pivotally secured intermediate its ends to the casing 11 in such a manner that one of its legs will engage the arm 27. Secured to the free end of the other leg of the lever 38 is a cable 39 which preferably extends to and is operable from the instrument board of the vehicle. The counterclockwise movement of the manual control plate 25 produced either by movement of the rod 35 or the cable 39 will cause the cam surfaces 24 of the control plate 25 to engage the rollers 23 and thereby move the pawls 20 outwardly out of engagement with the teeth of the ratchet wheel 19. It will be seen that with the pawls disengaged from the ratchet wheel 19, the shaft 14 is free to rotate in a clockwise direction.

Rotatably disposed on the hub of the ratchet wheel 19 is a pair of identical generally circular cam plates 41. These cam plates are held in frictional engagement with the faces of the ratchet wheel by means of springs 42 supported on pins 43 secured to one of the cam plates 41, as best shown in Figure 4. As shown in this figure, the pin 43 is secured to an outwardly extending ear 44 of the right hand cam plate 41 and passes through an opening formed in the outwardly extending ear 44 of the left hand cam plate 41. One end of the spring 42 engages the head 45 of the pin 43, while its other end engages the outer face of the ear 44 of the left hand cam plate. The friction between the cam plates 41 and the ratchet wheel 19 is of course determined among other things by the pressure between the engaging faces of the cam plates and the ratchet wheel. This pressure is so adjusted by means of the springs 42 that there is just sufficient friction between these members to cause the plates 41 to rotate with the ratchet wheel unless held against such motion by means of some external force. The contacting surfaces of the plates 41 and the ratchet wheel 19 should be oil lubricated. It will be noted from an inspection of Figure 1 that the ears 44 limit the movement of the plates 41 in a counterclockwise direction by engagement with the pivotal ends of the ratchets 18 and in a clockwise direction by engagement with shoulders 46 formed in the casing 11. The cam plates 41 are provided with diametrically opposed peripheral cam surfaces consisting of notches 47 formed with recesses or steps 48 and with curved shoulders 49.

The open left hand side of the casing 11 as viewed in Figure 1 may be closed by a cap 51 which may also serve as housing for a speedometer take-off 52. The speedometer take-off 52 is driven by a gearwheel 53 carried by a collar 54 keyed to the shaft 14. A gasket 55 is used to obtain an oil tight seal between the casing 51 and the sleeve 54.

The operation of the device as above described is as follows:

As shown in Figure 1, the arm 27 of the manual control plate 25 is in a vertical position and in this position the motor vehicle with which our device is associated is either in any forward gear or in neutral. The cam surfaces 24 of the manual control plate 25 are therefore out of engagement with the rollers 23, thereby permitting the pawls 20 of the ratchets 18 to enter the notches 47 and engage the teeth of the ratchet wheel 19. Assuming that a counterclockwise rotation of the drive shaft 14 produces a forward movement of the vehicle and that a clockwise rotation of the shaft produces a rearward movement of the vehicle, it will be seen that with the manual control plate 25 and the cam plates 41 in the relative positions as shown in Figure 1, any rearward movement of the vehicle will be prevented by the engagement of the pawls 20 with the teeth of the ratchet wheel 19.

Upon a clockwise movement of the manual control plate 25, which as above described may be accomplished either by putting the car in reverse gear or by pulling the cable 39 (Figure 3), the cam surfaces 24 of the plate 25 will engage the rollers 23, thereby lifting the pawls 20 from the notches 47. In this position the pawls 20 are out of engagement with the teeth of the ratchet wheel 19, and therefore the shaft can rotate in a clockwise direction and the vehicle move rearwardly. Due to the frictional engagement of the cam plates 41 with the ratchet wheel 19, a clockwise rotation of the shaft 14 will cause a clockwise rotation of the cam plates 41 until the ears 44 of the cam plates strike the shoulders 46 of the casing 11. This movement of the cam plates 41 will bring the recesses or steps 48 of the notches 47 in registration with the pawls 20 of the ratchets 18, as shown in Figure 5. As long as the cam plates 41 are held in the position shown in Figure 5, the steps 48 will serve to hold the pawls 20 out of engagement with the teeth of the ratchet wheel 19, regardless of the position of the manual control plate 25. The vehicle may therefore be shifted into neutral or any forward gear as shown in Figure 6 without causing the pawls 20 to engage the teeth of the ratchet wheel, provided, however, that no actual forward movement of the vehicle takes place. By making the tread of the steps 48 very shallow, as for example such that a movement of one degree or less of the drive shaft 14 in a counterclockwise direction will serve to disengage the pawls 20 from the steps 48, it is possible to bring our reverse locking mechanism into operation after the car has been placed in reverse gear by merely shifting into a forward gear and rotating the shaft 14 one degree by slightly engaging the clutch in order to take up the slight play that always exists between the drive shaft and the differential, without actually moving the car forward. As a matter of fact, the operation of the device may be made so sensitive that if the vehicle is moved rearwardly in reverse and then placed in neutral or any forward gear so that the lock is in the position shown in Figure 6, the mere application of either the foot or hand brake will cause sufficient relative motion between the body of the vehicle and its drive wheels to release the pawls 20 and permit them to engage the teeth of the ratchet wheel.

When the car is moving forward in a forward gear and the drive shaft therefore rotating in a counterclockwise direction, the cam plates 41 will, due to their frictional engagement with the ratchet wheel 19, occupy the position shown in Figure 7, with the ears 44 in engagement with the pivotal ends of the ratchets 18. In this position the curved shoulders 49 of the cam plates 41 will engage the pawls 20 of the ratchets 18, thereby holding them out of engagement with the teeth of the ratchet wheel.

From the above description it will be seen that our device is very simple in both construction and operation. Essentially the device consists of a ratchet wheel driven directly or indirectly by the drive shaft of a vehicle or by one of its drive wheels; a pawl pivoted to some fixed part of the vehicle and adapted to engage the ratchet wheel; cams operating in response to the movement of the ratchet wheel for disengaging the pawl in a predetermined manner, and a manual control cam for also disengaging the pawl in a predetermined manner. With the single exception of bringing the locking mechanism into play after the vehicle has been placed in reverse gear or placed in neutral or any forward gear after being in reverse gear, a vehicle equipped with our device may be operated in the same manner as any other car, and if for any reason it is desired to render the mechanism inoperative all that is required is a manipulation of the cable 39 from the instrument panel.

We claim:

1. In a motor vehicle, a reverse locking mechanism comprising: a ratchet wheel adapted to rotate in response to the rotation of the drive shaft of said vehicle; a pawl pivoted to some fixed part of the vehicle and adapted to engage said ratchet wheel; means for urging said pawl in engagement with the ratchet wheel; a cam plate arranged to oscillate about a fixed point through a predetermined arc in response to the rotation of said ratchet wheel; a cam surface on said cam plate of such shape that when the plate is in one extreme position it will serve to hold the pawl clear of said ratchet wheel, but upon a slight movement of the cam plate in the direction of its opposite extreme position the pawl will be permitted to drop into engagement with said ratchet wheel and upon further movement of the cam plate toward said opposite extreme position the pawl will be disengaged and held away from said ratchet wheel; and means independent of said cam plate for moving and holding said pawl out of engagement with said ratchet wheel.

2. In a motor vehicle, a reverse locking mechanism comprising: a ratchet wheel adapted to rotate in response to the rotation of the drive shaft of said vehicle; a pawl pivoted to some fixed part of the vehicle and adapted to engage said ratchet wheel; means for urging said pawl in engagement with the ratchet wheel; a cam plate arranged to oscillate about a fixed point through a predetermined arc in response to the rotation of said ratchet wheel; a cam surface on said cam plate of such shape that when the plate is in one extreme position it will serve to hold the pawl clear of said ratchet wheel, but upon a slight movement of the cam plate in the direction of its opposite extreme position the pawl will be permitted to drop into engagement with said ratchet wheel and upon further movement of the cam plate toward said opposite extreme position the pawl will be disengaged and held away from said ratchet wheel; a manual control plate arranged to oscillate between predetermined limits about a center fixed with respect to the vehicle and provided with a cam surface adapted to disengage said pawl from the ratchet wheel when the control plate is in one of its extreme positions; means for urging said control plate to its opposite extreme position; and means operable in response to a movement of the reverse gear shift mechanism of the vehicle for moving said control plate to its first mentioned extreme position.

3. In a motor vehicle, a reverse locking mechanism comprising: a ratchet wheel secured to the drive shaft of the vehicle; a pawl pivoted to some fixed part of the vehicle; a spring adapted to urge said pawl in engagement with said ratchet wheel; a cam plate in contact with said ratchet wheel and adapted to be moved between two extreme positons by frictional engagement therewith; a cam surface on said cam plate of such shape that when the plate is in one extreme position it will serve to hold the pawl clear of said ratchet wheel, but upon a slight movement of the cam plate toward its opposite extreme position the pawl will be permitted to drop into engagement with said ratchet wheel and upon further movement of the cam plate to its opposite extreme position the pawl will be disengaged and held away from said ratchet wheel; and means independent of said cam plate for moving and holding said pawl out of engagement with said ratchet wheel.

4. In a motor vehicle, a reverse locking mechanism comprising: a ratchet wheel secured to the drive shaft of the vehicle; a pawl pivoted to some fixed part of the vehicle; a spring adapted to urge said pawl in engagement with said ratchet wheel; a cam plate in contact with said ratchet wheel and adapted to be moved between two extreme positions by frictional engagement therewith; a cam surface on said cam plate of such shape that when the plate is in one extreme position it will serve to hold the pawl clear of said ratchet wheel, but upon a slight movement of the cam plate toward its opposite extreme position the pawl will be permitted to drop into engagement with said ratchet wheel and upon further movement of the cam plate to its opposite extreme position the pawl will be disengaged and held away from said ratchet wheel; a manual control plate arranged to oscillate between predetermined limits about said shaft and provided with a cam surface adapted to disengage said pawl from the ratchet wheel when the control plate is in one of its extreme positions; means for urging said control plate to its opposite extreme position; and means operable in response to a movement of the reverse gear shift mechanism of the vehicle for moving said control plate to its first mentioned extreme position.

5. A reverse locking mechanism comprising: a casing; a ratchet wheel accommodated within said casing and adapted to rotate in response to the rotation of the drive shaft of a motor vehicle; a pawl pivoted to said casing for engagement with said ratchet wheel; means for urging said pawl in engagement with said ratchet wheel; a cam plate arranged to oscillate about a center fixed with respect to said casing through a predetermined arc; means for holding said cam plate in frictional engagement with said ratchet wheel; a peripheral cam surface on said cam plate of such shape that when the plate is in one extreme position it will serve to hold the pawl clear of said ratchet wheel, but upon a slight movement of the cam plate in the direction of its opposite extreme position the pawl will be permitted to drop into engagement with said ratchet wheel and upon further movement of the cam plate toward said opposite extreme position the pawl will be disengaged and held away from said ratchet wheel; and means independent of said cam plate for moving and holding said pawl out of engagement with said ratchet wheel.

6. A reverse locking mechanism comprising: a casing; a ratchet wheel accommodated within said casing and adapted to rotate in response to the rotation of the drive shaft of a motor vehicle; cam plates disposed on either side of said ratchet wheel and arranged to oscillate about a fixed center with respect to said casing through a predetermined arc; means for holding said cam plates in frictional engagement with said ratchet wheel; a pawl pivoted to said casing for engagement with said ratchet wheel; and means for urging said pawl in engagement with said ratchet wheel; peripheral cam surfaces on said cam plates of such shape that when the plates are in one extreme position they will serve to hold the pawl clear of said ratchet wheel, but upon a slight movement of the cam plates in the direction of their opposite extreme position, the pawl will be permitted to drop into engagement with said ratchet wheel and upon further movement of the cam plates towards said opposite extreme position, the pawl will be disengaged and held away from said ratchet wheel; and means independent of said cam plates for moving and holding said pawl out of engagement with said ratchet wheel.

7. In a vehicle, a reverse locking mechanism comprising: a ratchet wheel adapted to rotate in response to the rotation of any rotating member of said vehicle; a pawl pivoted to some fixed part of the vehicle and adapted to engage said ratchet wheel; means for urging said pawl in engagement with the ratchet wheel; a cam plate arranged to oscillate about a fixed point through a predetermined arc in response to the rotation of said ratchet wheel; a cam surface on said cam plate of such shape that when the plate is in one extreme position it will serve to hold the pawl clear of said ratchet wheel, but upon a slight movement of the cam plate in the direction of its opposite extreme position the pawl will be permitted to drop into engagement with said ratchet wheel and upon further movement of the cam plate toward said opposite extreme position the pawl will be disengaged and held away from said ratchet wheel; and means independent of said cam plate for moving and holding said pawl out of engagement with said ratchet wheel.

8. In a vehicle, a reverse locking mechanism comprising: a ratchet wheel adapted to rotate in response to the rotation of any rotating member of said vehicle; a pawl pivoted to some fixed part of the vehicle and adapted to engage said ratchet wheel; means for urging said pawl in engagement with the ratchet wheel; a cam plate arranged to oscillate about a fixed point through a predetermined arc in response to the rotation of said ratchet wheel; a cam surface on said cam plate of such shape that when the plate is in one extreme position it will serve to hold the pawl clear of said ratchet wheel, but upon a slight movement of the cam plate in the direction of its opposite extreme position the pawl will be permitted to drop into engagement with said ratchet wheel and upon further movement of the cam plate toward said opposite extreme position the pawl will be disengaged and held away from said ratchet wheel; a manual control plate arranged to oscillate between predetermined limits about a center fixed with respect to the vehicle and provided with a cam surface adapted to disengage said pawl from the ratchet wheel when the control plate is in one of its extreme positions; means for urging said control plate to its opposite extreme position; and means operable in response to a movement of the reverse gear shift mechanism of the vehicle for moving said control plate to its first mentioned extreme position.

CHARLES P. CIRAC.
THOMAS W. COOPER.
WILLIAM W. MacDONALD.